M. W. TEBYRIÇÁ.
SEPARATING MACHINE.
APPLICATION FILED OCT. 8, 1912.
1,061,141.
Patented May 6, 1913.
3 SHEETS—SHEET 1.
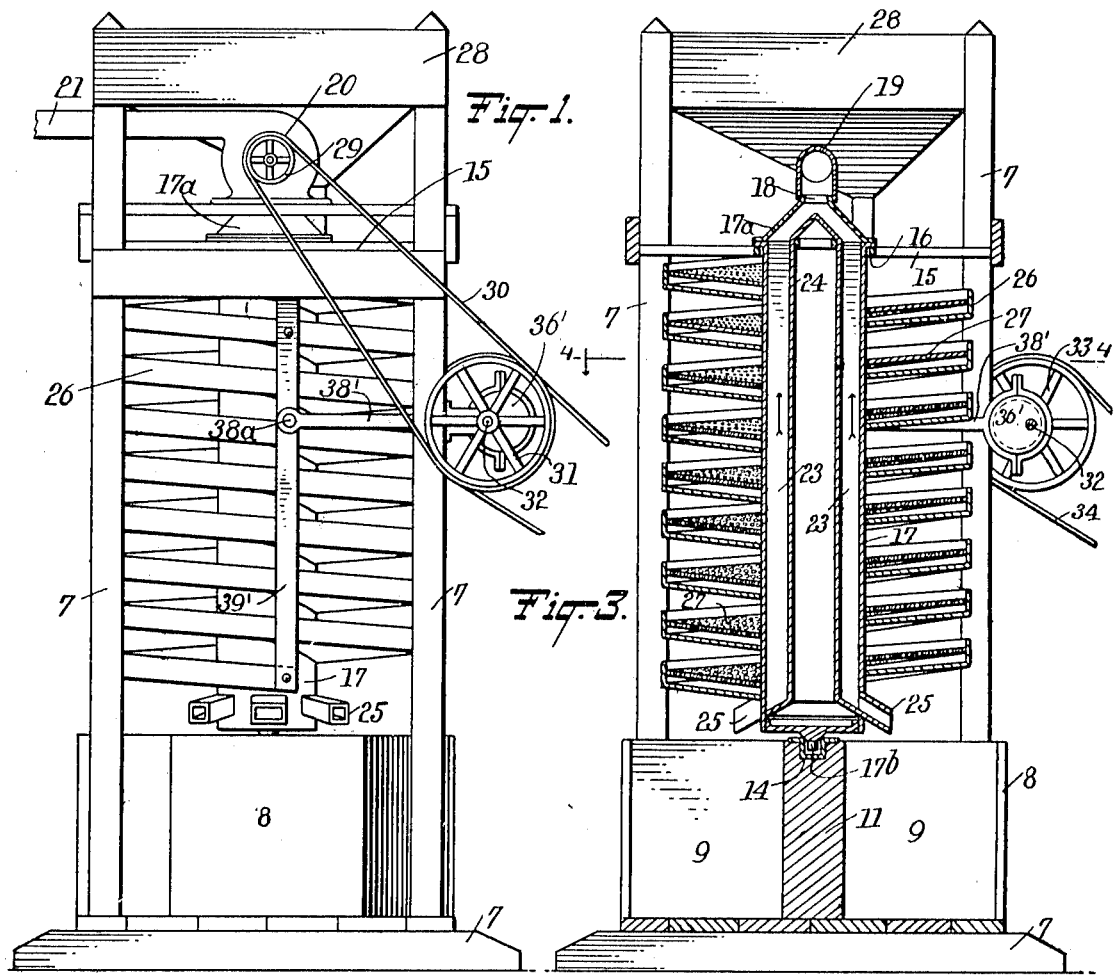
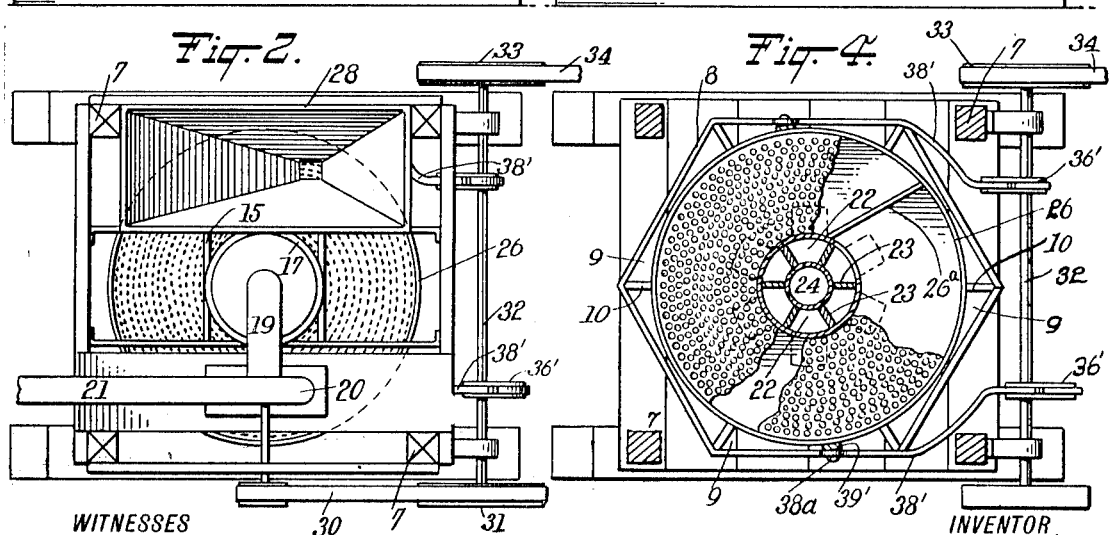
WITNESSES
George Bambay.
F. J. Gallagher
INVENTOR
Mario W. Tebyriçá,
BY Munn & Co
ATTORNEYS

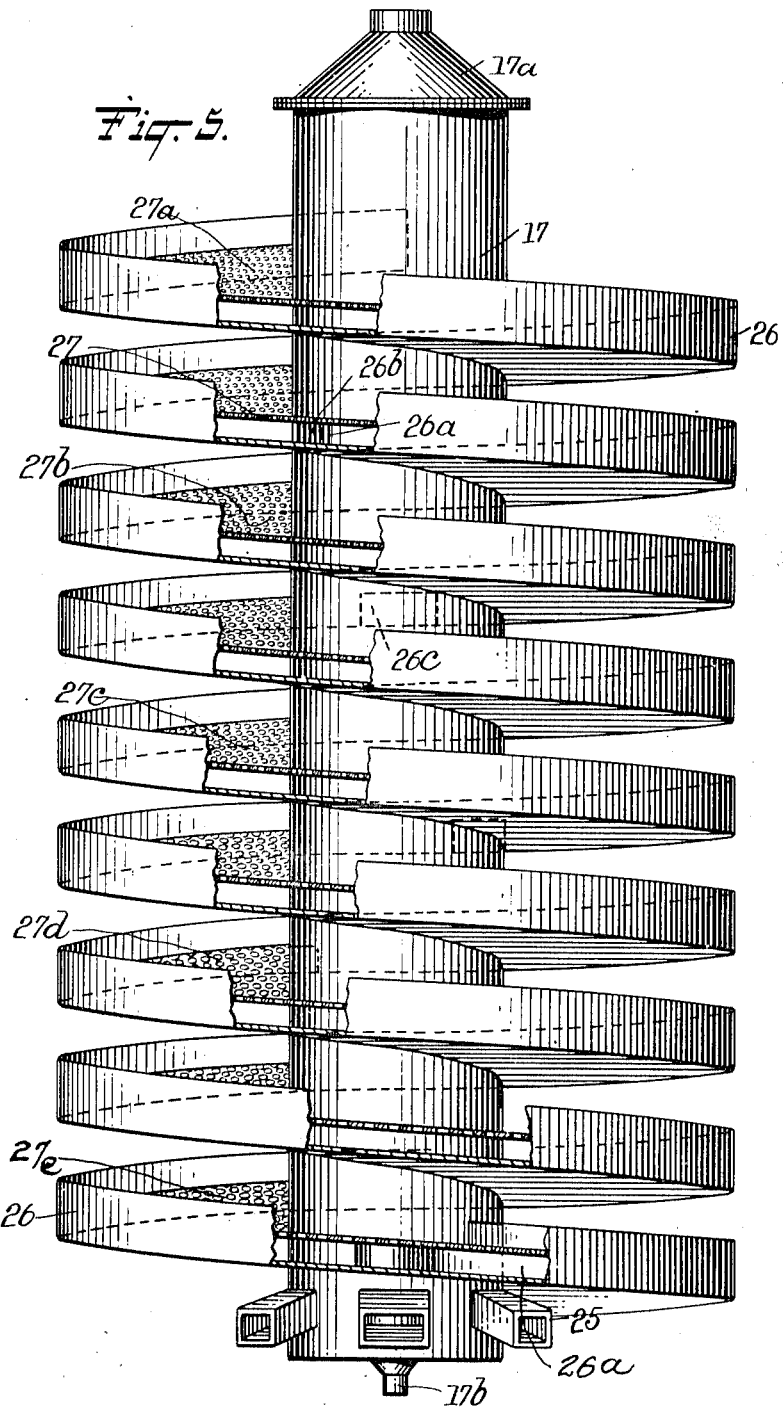

M. W. TEBYRIÇÁ.
SEPARATING MACHINE.
APPLICATION FILED OCT. 8, 1912.
1,061,141.
Patented May 6, 1913.
3 SHEETS—SHEET 3.
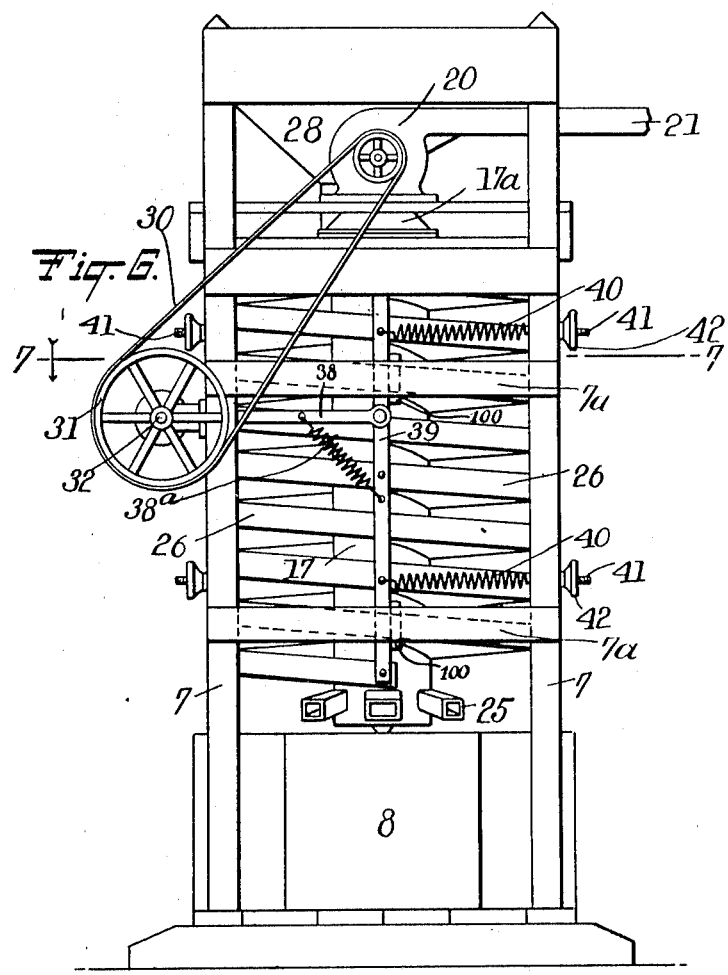
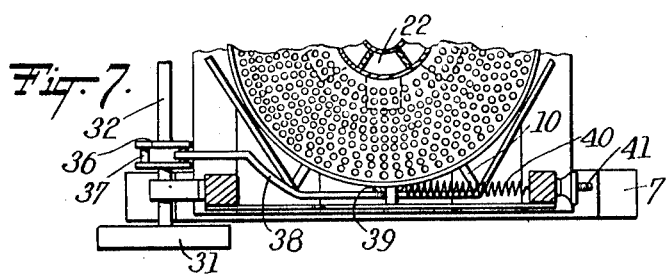
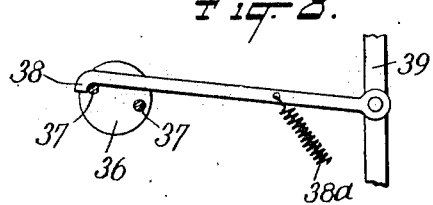
WITNESSES
George Bambay.
INVENTOR
Mario W. Tebyriçá,
BY Munn & Co
ATTORNEYS

UNITED STATES PATENT OFFICE.

MARIO W. TEBYRIÇÁ, OF SAO PAULO, BRAZIL.

SEPARATING-MACHINE.

1,061,141.  Specification of Letters Patent.  Patented May 6, 1913.

Application filed October 8, 1912. Serial No. 724,521.

*To all whom it may concern:*

Be it known that I, MARIO W. TEBYRIÇÁ, a citizen of the Republic of Brazil, and a resident of Sao Paulo, Brazil, South America, have invented a new and Improved Separating-Machine, of which the following is a full, clear, and exact description.

This invention relates generally to separating machines, and is more particularly directed to structures employed in grading coffee, cereals, and other seed-foods.

The invention comprehends an apparatus whereby the material to be assorted or graded may be fed continuously into the machine, and through the aid of a number of separating sieves a grading of such material may be effected, the graded material being discharged through separate chutes into separate bins.

The invention further comprehends means whereby the material in its downward travel through the machine is subjected to rapid agitation in order to facilitate the separation or grading.

The construction described and claimed embodies means whereby a draft removes the impurities from portions of the material as the same travels downwardly.

Many objects and advantages following the use of the particular embodiment of the inventive idea disclosed will appear as the description thereof proceeds, the inventive idea disclosed being comprehended within the spirit of the claims appended.

Reference is to be had to the accompanying drawings forming a part of this specification, in which like characters of reference indicate corresponding parts in all the views, and in which—

Figure 1 is a side elevation of the complete machine; Fig. 2 is a top plan view thereof; Fig. 3 is a vertical sectional view; Fig. 4 is a sectional view on the line 4—4 of Fig. 3; Fig. 5 is a perspective view of the spiral sieve and the parts associated therewith, this view also showing some of the openings whereby the graded material is passed into the different chutes; Fig. 6 is a side view of a separating machine equipped with a modified form of agitating means; Fig. 7 is a partial sectional view thereof on the line 7—7 of Fig. 6; while Fig. 8 is a detail of part of the agitating mechanism.

The structure shown embodies a framework designated 7, and adjacent the bottom is a grain box 8 separated into compartments 9 by means of radially disposed partitions 10. These compartments, because of the use to which they are put, are designated as "grain bins". A pillar 11 is disposed centrally within the grain box, resting on the bottom thereof; the structure thus far described is unitary and may be conveniently moved from place to place when so desired. Mounted on top of the pillar 11 is a bearing 14, and at some distance above the grain box is a spider 15 carried by the framework and provided with a bearing 16.

Movably mounted within the bearings 14 and 16 is a cylindrical drum 17, the upper end of which is provided with a conical portion 17$^a$, the lower end being provided with a vertical neck 17$^b$ resting upon the bearing 14. The conical portion 17$^a$ is provided with a neck 18, and fitted upon the latter is a pipe 19 which serves the double purpose of a bearing and as a means for connecting the drum 17 with a suction mechanism 20. This mechanism is connected with a pipe 21 through which air is discharged, the structure constituting in effect a suction for removing impurities from the material, as hereinafter set forth.

The interior of the drum is divided into a number of longitudinally extending compartments 22, hereinafter designated as "chutes", by means of radially disposed partitions 23. These chutes are bounded inwardly by a cylinder 24, and open respectively into spouts 25 which extend radially outwardly from the drum 17. Each of the spouts 25 is directed into one of the bins of the grain box 8, and they are of such width that the drum 17 may, within reasonable limits, be rocked about the bearings carried thereby without carrying the spouts a sufficient distance to displace them from the respective bins with which they are associated; that is to say, a particular spout being associated with a particular bin, the rocking of the drum has not sufficient amplitude to carry the spout to such position that it will discharge into any other bin than the one with which it is associated. A long trough 26, having an inclined bottom, is wound spirally around the drum 17, and is fixed to the same so that when the drum is rocked it carries the trough with it.

Mounted within the trough 26, and coextensive therewith, and positioned a suitable distance above the bottom thereof, is a sieve which is substantially divided into sections 27$^a$, 27$^b$, 27$^c$, 27$^d$, and 27$^e$. These sections are provided with perforations which vary in size, those in the uppermost section being smaller than those in the lower sections, the perforations being of as many different sizes as there are sections, the number of sections, however, being less by one than the number of chutes 22 and the number of spouts 25. At intervals along the spiral trough 26 are guides 26$^a$ for diverting the grain or other material into the respective chutes, the drum 17 being provided with openings 26$^b$, 26$^c$, etc., as shown, to facilitate the travel of the grain into the chutes; it will be apparent that the number of openings will depend upon the number of sections of the spiral trough, which, in turn, will depend upon the different sizes of graded material.

A hopper 28 is located near the top of the machine and discharges the grain continuously into the trough; the shaft of the suction fan 20 is preferably provided with a pulley 29, and engaging the latter is a belt 30 which also engages a pulley 31 mounted upon a shaft 32, which shaft is provided with a second pulley 33 and a belt 34 passing there-around and communicating with a suitable source of power, whereby movement of the parts of the machine may be brought about.

As the grain, or other material, is continuously fed into the hopper and passes on down to the different sections of the sieve, it is desirable that some sort of movement be imparted to the sieve whereby it may be kept in a state of motion in order to facilitate the passage of the grain there-along; different devices may be employed for this purpose, and in the drawings I have illustrated two forms. Referring particularly to Figs. 1 to 4, inclusive, it will be noted that the shaft 32 is provided with eccentrics 36' which are oppositely positioned. Engaging the eccentrics are links 38', and secured to opposite portions of the trough are bars 39' to which the said links are pivotally secured, as at 38$^a$. As the shaft 32 is revolved the engagement of the eccentric with the links will move the trough, and with it the sieve, alternately in opposite directions about the bearings at the top and bottom of the cylinder 17 as a center, the grain, or other material, passing around the sieve being thereby kept in a state of motion, that is, being shaken, whereby separation of the different grains into the proper compartments is facilitated.

Referring particularly to Figs. 6 to 8, inclusive, it will be noted that the above-mentioned shaft 32 may be provided with a crank disk 36 having pins 37 eccentrically positioned with respect to the center of the disk, the pins being preferably at diametrically opposite points on the disk. A hook 38 is pivotally mounted on a bar 39, the hook being adapted to be successively engaged by the said pins 37 as the shaft turns. The bar 39 is secured to the outer peripheral portion of the drum 17, the drum being held in position by means of the springs 40; the bar and the hook are maintained relatively to each other within certain limits by means of a helical spring 38$^a$ engaging each of the parts. The ends of the springs 40 are provided with screw bolts 41 passing through a portion of the framework 7, there being nuts 42 engaging the outer ends of the bolts, whereby the tension of the springs may be varied. Secured to transversely extending pieces 7$^a$ of the frame are lugs 100, or equivalent devices, which normally engage the said bar 39, as shown particularly in Fig. 6; as the shaft 32 is turned the pins 36 will pull the hook 38 and the drum forwardly a certain distance against the tension of the springs 40, the pins becoming disengaged from the hook as the turning proceeds, the result being that the springs 40 bring the drum rapidly backwardly against the said lugs 100, whereby a shock is transmitted to the trough and the sieve, thereby moving these parts through a certain angle, which movement, or, as it were, jarring, occurs many times a minute, the result being that the sieve is kept in a continuous state of agitation, thereby tending to promote the proper segregation of the seeds of different sizes.

The operation of the machine may be summed up as follows: Grain, which at the start is a mixture of seeds of different sizes, is placed in the hopper 28 and is fed therefrom down into the trough 26. Power being applied to the pulley 33 the shaft 32 is turned, with the consequent jarring or agitation of the trough and sieve as already explained. The blower 20 also operating, through the medium of the belt 30, which is driven by the pulley 31 on the shaft 32, draws air upwardly through the various chutes 22, as will be understood from Fig. 3 particularly, so that any light impurity, such as dust, is drawn up by the blower, and discharged by the pipe 21. The various sections of the spiral sieve 27 being graduated as described, according to the size of the perforations or meshes, the grain is separated into various grades according to size, the grades contemplated being six, that is, one for each section and one grade of very coarse material which is unable to be passed through any of the sieve sections. This grade in question is passed through one of the chutes 25, and like each of the other grades falls into one of the bins. The operation of the machine is continuous as long as the shaft 32 is turned, and as long as grain is provided to the hopper 28.

Of course, it is understood that the machine may be considerably varied in many of its elements without departing from the inventive idea disclosed, and that it may be used in connection with many different kinds of materials than those mentioned.

Having thus described my invention, I claim as new and desire to secure by Letters Patent:—

1. A separating machine comprising a drum, a trough spirally wound thereon, a screen spirally wound on the drum and spaced from the trough, means for rocking the drum, the trough and the screen in order to separate material traveling upon the said screen and around the drum, a suction fan, the drum being provided with a number of chutes communicating with the fan, and means for directing into the said chutes the material assorted into different sizes.

2. A separating machine comprising a drum, a tubular member mounted thereon, a number of partitions extending from the said tubular member to the said drum and disposed radially so as to form a number of separate chutes, a spiral trough having an inclined bottom mounted on the drum, a screen carried by the said trough, the said drum being provided with a number of openings communicating with different portions of the trough, the said openings being adapted to receive material of different sizes and convey it to the various chutes, and means for imparting movement to the drum the trough and the screen in order to facilitate separation of the material.

3. A construction of the class described, comprising a vertically extending drum provided with a number of compartments extending longitudinally thereof, openings adjacent the bottom of the drum communicating with the compartments, a spiral sieve carried by the drum, the said sieve being provided with means whereby it is divided into a number of sections, the drum being provided with a number of openings, one opening communicating with one compartment, whereby material may be passed from different portions of the sieve into the said compartments, the material being thereby graded according to size.

4. A separating machine comprising a drum, the interior thereof being provided with a number of chutes extending longitudinally thereof, openings adjacent the bottom of the drum communicating with the chutes, a spiral trough carried on the drum, the trough being provided with a sieve, partitions carried by the trough at different portions thereof, and openings carried by the drum adjacent the partitions, one opening communicating with one chute, whereby material of the same size is collected in one chute.

5. A separating machine, comprising a drum movably mounted in position and provided with a number of chutes extending longitudinally thereof, a trough spirally encircling the drum and fixed thereto, a sieve carried by the trough and spaced from the bottom thereof, the sieve being made up of a number of portions having perforations of different sizes, the drum being provided with a number of openings, one opening communicating with one chute, the said openings being positioned on the drum adjacent the different portions of the sieve, whereby when a shaking movement is imparted to the machine material entered on the top of the sieve will be separated according to size, material of the same size being received in the same chute.

6. A construction of the class described, comprising a grain box divided into compartments serving as bins, a drum positioned above the grain box and provided with a number of chutes extending longitudinally thereof, one chute being associated with one bin, a continuous trough extending spirally around the said drum, the trough being provided with a sieve separated from the bottom thereof, the said sieve being made up of a number of portions having perforations of different sizes, the drum being provided with a number of openings, one opening communicating with one chute, the said openings being adapted to receive material from the trough which has been passed through the sieve, material of substantially the same size being received in one chute.

7. A separating machine comprising a drum, the drum being provided with a number of chutes extending longitudinally thereof, means whereby the drum may be movably mounted in position, a spiral trough having an inclined bottom carried on the drum, a screen carried by the trough and spaced from the bottom thereof, the screen being made up of a number of portions having perforations of different sizes, the drum being provided with a number of openings communicating with different portions of the trough, guides adjacent the openings, one opening being associated with one chute, and means whereby the drum and trough may be shaken in order to pass material through different portions of the sieve, the said material being directed into the said openings by means of the said guides, material of substantially the same size being received in one chute.

8. A separating machine comprising a drum, a number of chutes extending longitudinally thereof, bins associated with the different chutes and adapted to receive material therefrom, means whereby the drum may be movably mounted in position, a continuous trough extending spirally of the drum, a sieve associated with the trough and spaced from the bottom thereof, the sieve being made up of portions having perforations of different sizes, the drum being provided with a number of openings communicating with different portions of the trough, guides carried by the trough and adjacent the openings, and means for imparting a shaking movement to the drum and trough, whereby material entered adjacent the top of the trough will pass through the machine, being graded according to size, material of substantially the same size being directed into the same opening and chute in the drum by a guide, the said material being later received in one of the bins.

In testimony whereof I have signed my name to this specification in the presence of two subscribing witnesses.

MARIO W. TEBYRIÇÁ.

Witnesses:
PHILIP D. ROLLHAUS,
LAURENCE J. GALLAGHER.